Figure 1:
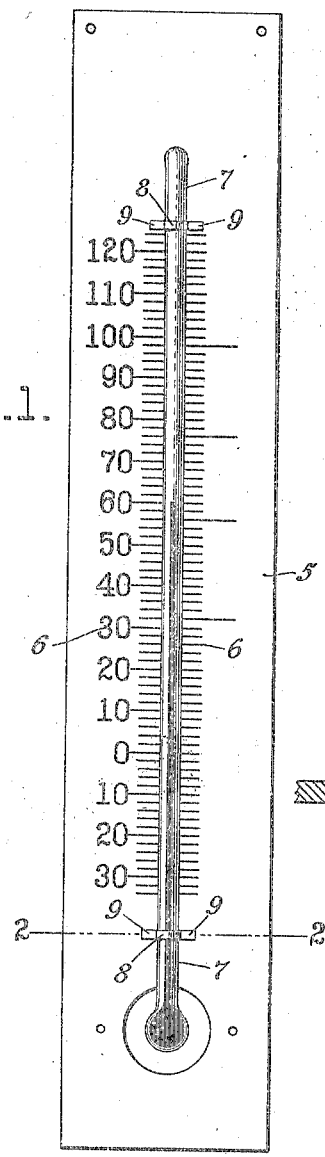

H. P. MILKER.
THERMOMETER.
APPLICATION FILED MAY 28, 1919.

1,345,687.

Patented July 6, 1920.

WITNESSES

INVENTOR
HERBERT P. MILKER
BY
ATTORNEYS

UNITED STATES PATENT OFFICE.

HERBERT P. MILKER, OF BROOKLYN, NEW YORK, ASSIGNOR TO CHARLES J. TAGLIABUE MANUFACTURING CO., OF BROOKLYN, NEW YORK, A CORPORATION OF NEW YORK.

THERMOMETER.

1,345,687.      Specification of Letters Patent.      Patented July 6, 1920.

Application filed May 28, 1919. Serial No. 300,390.

*To all whom it may concern:*

Be it known that I, HERBERT P. MILKER, a citizen of the United States, and resident of the borough of Brooklyn, county of Kings, city and State of New York, have invented certain new and useful Improvements in Thermometers, of which the following is a specification.

My invention relates to thermometers and more particularly to that type thereof commonly used for indicating atmospheric temperatures.

This type of thermometers, in many existing forms, includes a scale plate or back of metal with a proper scale produced thereon and a thermometer tube located on said plate in proper coöperative relation to said scale. In order to maintain the accuracy of the instrument it is essential that the tube remain fixed, particularly against lengthwise movement, relatively to said scale, in order that the fluid column in said tube and said scale may properly coöperate to provide a correct reading. Heretofore considerable difficulty has been experienced in securing this fixture of the tube on the plate, several kinds of devices having been tried with indifferent success. For instance in some cases metal clips have been placed at intervals about the tube and passed through the back, the ends of said clips being bent over to prevent withdrawal thereof; in other instances the clips have been replaced by wire loops which pass around the tube and through the back and have their ends twisted about each other. Both of these devices have been found insufficient by themselves to prevent lengthwise movement of the tube so that it has been necessary to form the upper end of said tube with a transverse projection arranged to fit into an opening in the scale-plate or back. Obviously to fix the tube against lengthwise movement, with this arrangement, it is necessary that the projection fit the opening snugly at all points; because of the varied form and configuration of the projections, no two being exactly alike, it is necessary, with the arrangement in question to carefully and individually shape each opening to correspond with the form of the coöperating projection. This operation requires skill and consumes considerable time which adds to the cost of the production of the thermometer and for these reasons is objectionable. Both the clips and the wires in addition present an unfinished appearance when the scale plate is viewed from the rear, this being particularly true of the wire loops, the twisted ends of which generally stand out from the rear surface of said back or scale plate.

The object of my invention is to overcome the above objections and to provide a construction in which the tube is rigidly fixed on the scale plate particularly against lengthwise movement in a simple, efficient and attractive manner and at a minimum cost of production. A further object of my invention is to provide a construction in which the indicated results are obtained without the use of an end projection on the tube and a coöperating opening in the scale plate. My invention will be fully described hereinafter and the features of novelty will be pointed out in the appended claim.

Figure 2:
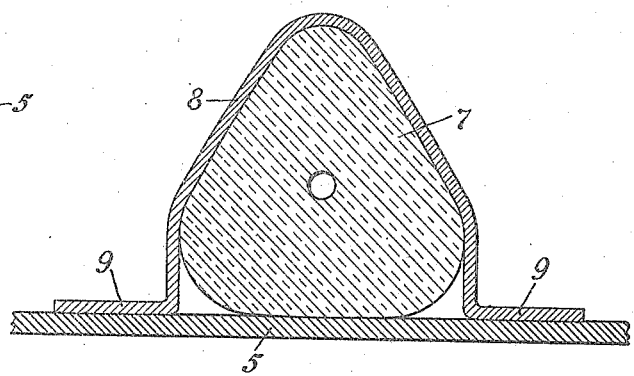

Reference is to be had to the accompanying drawings, which for illustrative and descriptive purposes, show an example of my invention, and in which Figure 1 is a face view of a thermometer scale-plate or back with the tube fastened thereon according to my invention and Fig. 2 is a cross-section thereof, on an enlarged scale on the line 2—2 of Fig. 1.

In the illustrated example, 5 represents the scale-plate or back which is constructed of metal and is of any desired shape and dimensions, said scale-plate, as usual, being provided on its front face with the customary scale 6. A thermometer tube 7 of any well known construction or type is located upon the front face of said scale-plate 5 in proper coöperative relation to the scale 6.

In the present instance the means whereby said tube 7 is fixed on said scale-plate 5 against movement, and more particularly against lengthwise shifting, relatively to the scale 6, comprises clips 8 of relatively soft metal. The clips 8 extend over the tube 7, preferably at points beyond the opposite ends of the scale 6, and closely hub said tube, said clips conforming minutely to the form of the outer surface of said tube 7. Members 9 comprising integral parts of the clips 8 extend therefrom in surface engagement with the plate 5 and are integrally joined thereto. In the illustrated example the members 9 extend in opposite directions from the clips 8, in surface engagement with the outer face of said scale-plate 5 and are welded to said plate preferably by autogenous welding, which may be caused to form either a continuous bond throughout said members 9 or to unite the latter to said plate by spot welding as desired.

In applying the clips 8 suitable means are used to cause the same to closely hug the tube and to minutely conform to the shape of the outer surface thereof before the union between the members 9 and the plate 5 is effected. A frictional engagement of maximum intensity is thus secured between the clips and the tube which remains substantially undisturbed during the life of the thermometer, because of the integral connection or union between the members 9 of said clips and the plate 5. The tube 7 is thus rigidly fixed on said plate 5 particularly against movement in the direction of its length, relatively to the scale 6, so that the accuracy of the thermometer remains unchanged and reliable and accurate readings are always guaranteed; with thermometers in which the possibility of a shifting of the tube relatively to the scale exists, the readings are always subject to doubt as will be obvious.

Various changes in the specific form shown and described may be made within the scope of the claim without departing from the spirit of my invention.

I claim:

The combination of a thermometer scale-plate of metal having a scale produced on its one face, a thermometer tube on said plate in coöperative relation to said scale, metallic clips hugging said tube and conforming minutely to the form of the outer surface thereof and members comprising integral parts of said clips and extending in surface engagement with said plate and joined thereto by welding whereby said tube is fixed on said scale-plate against lengthwise movement relatively to said scale.

In testimony whereof I have hereunto set my hand.

HERBERT P. MILKER.